No. 645,918. Patented Mar. 20, 1900.
J. G. HANKS.
DISTANCE MEASURING INSTRUMENT.
(Application filed June 14, 1898. Renewed Aug. 28, 1899.)
(No Model.) 3 Sheets—Sheet 1.
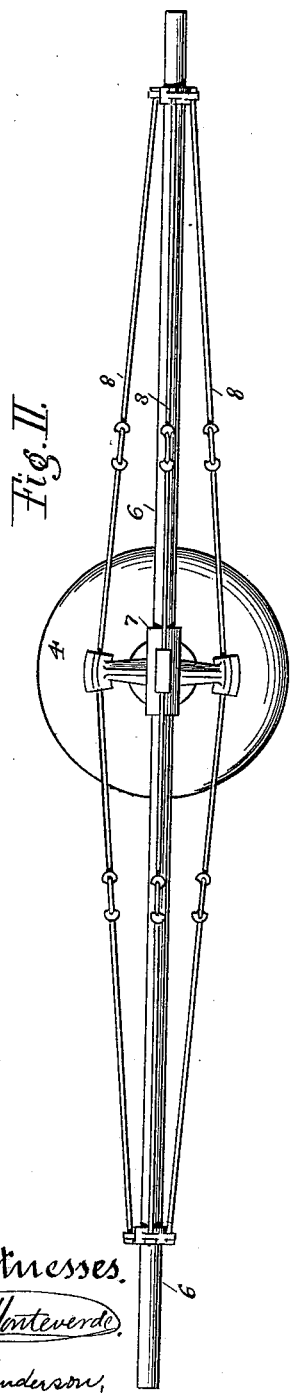
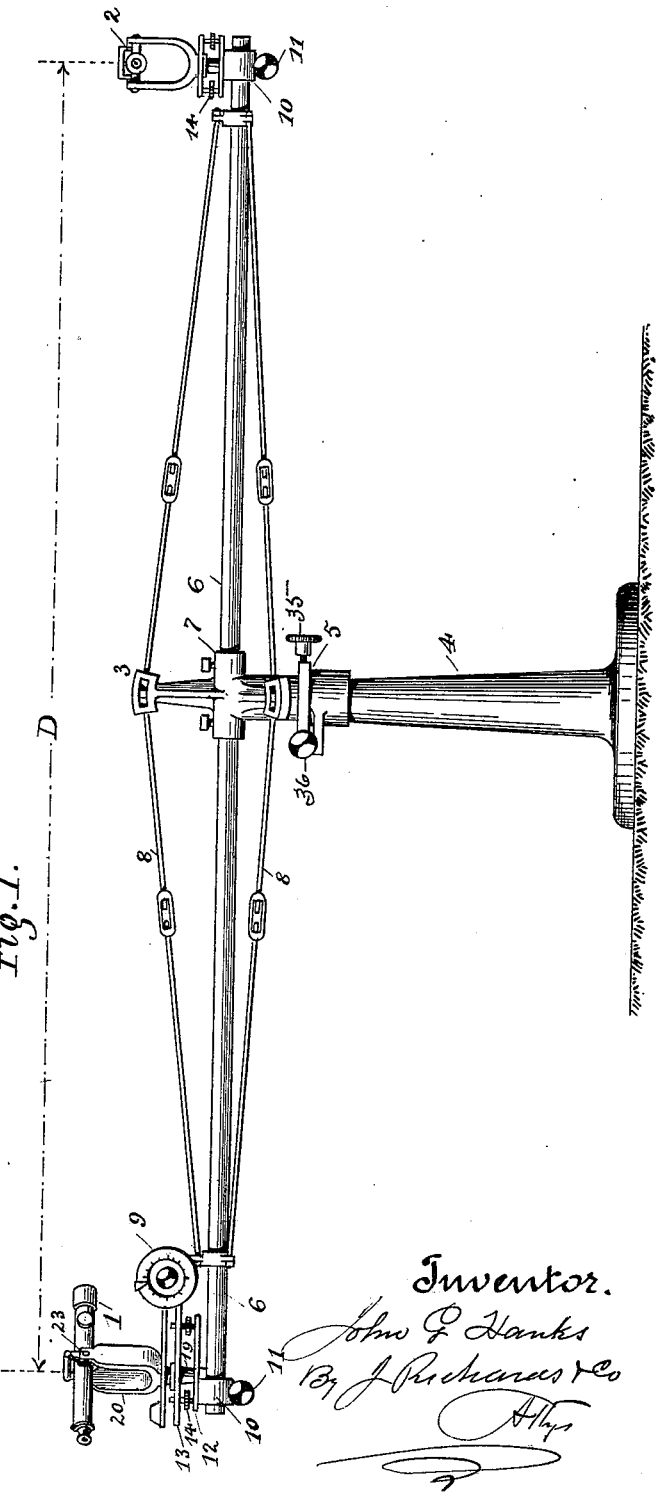
Witnesses.
Inventor.
John G. Hanks
By J. Richards & Co
Attys No. 645,918. Patented Mar. 20, 1900.
J. G. HANKS.
DISTANCE MEASURING INSTRUMENT.
(Application filed June 14, 1898. Renewed Aug. 28, 1899.)
(No Model.) 3 Sheets—Sheet 2.
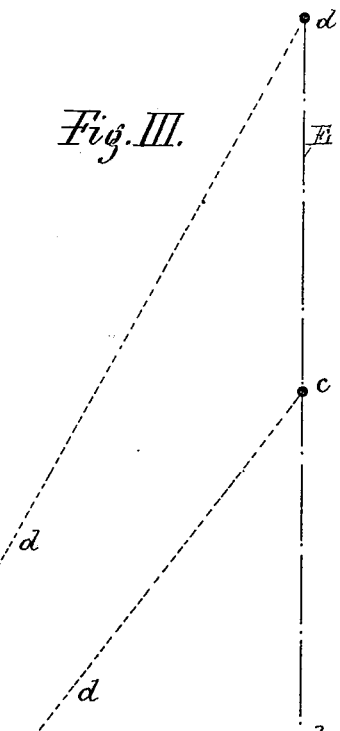
Fig. VIII.
| F | G | H | I | J | K |
|---|---|---|---|---|---|
|   |   |   |   |   |   |
|   |   |   |   |   |   |
|   |   |   |   |   |   |
|   |   |   |   |   |   |
|   |   |   |   |   |   |
|   |   |   |   |   |   |
F = Revolutions of Circular Scale, from zero.
G = Fraction of revolutions.
H = Degrees of arc (fraction of rev.)
I = Minutes of arc.
J = Distance in miles.
K = Distance in feet.
Witnesses. Inventor.

No. 645,918. Patented Mar. 20, 1900.
J. G. HANKS.
DISTANCE MEASURING INSTRUMENT.
(Application filed June 14, 1898. Renewed Aug. 28, 1899.)
(No Model.) 3 Sheets—Sheet 3.
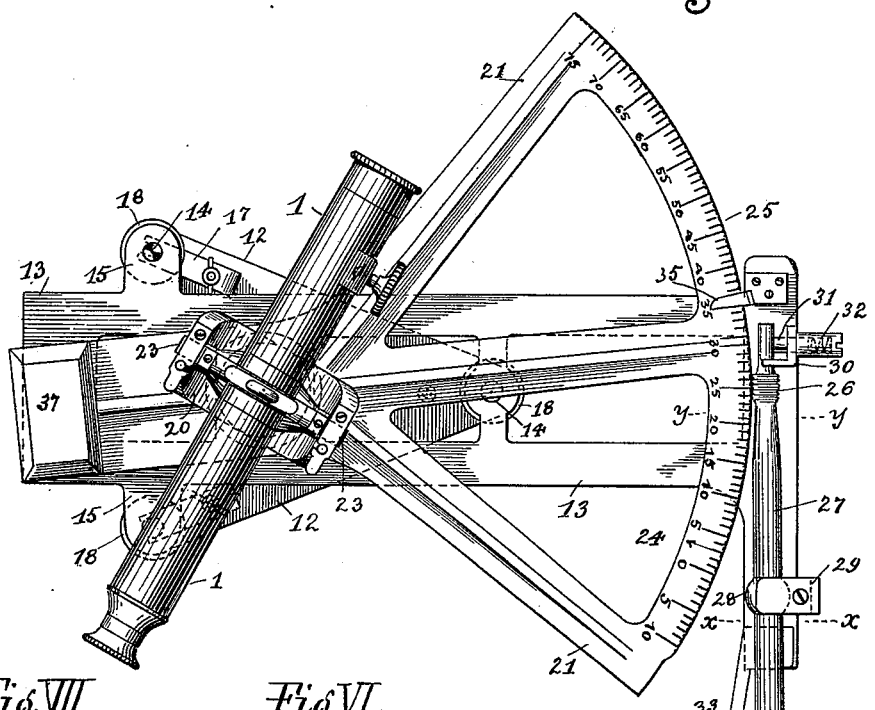
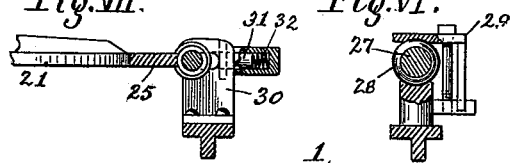
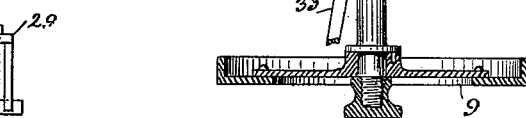
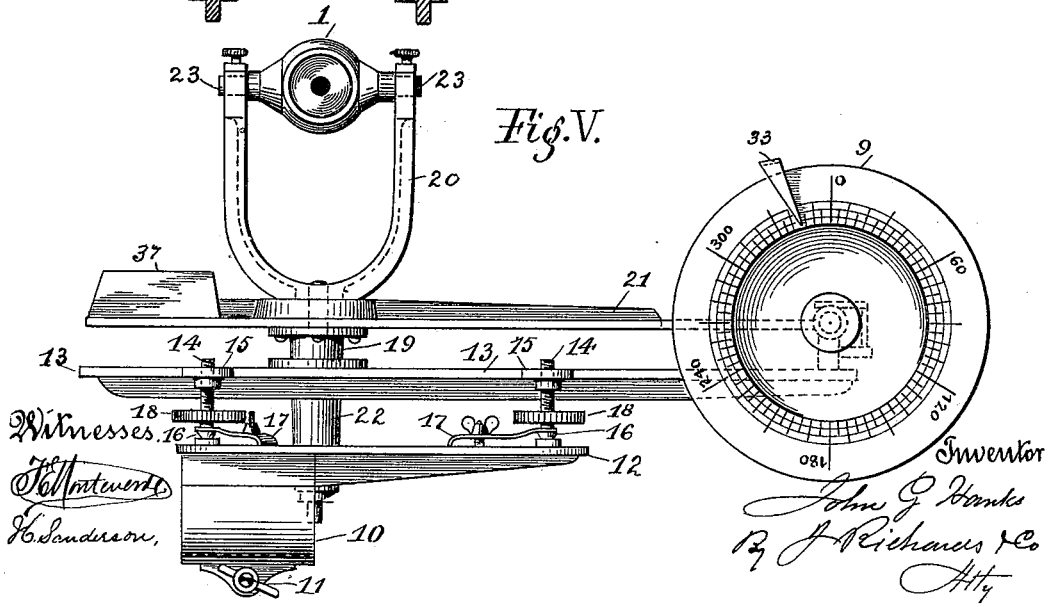

UNITED STATES PATENT OFFICE.

JOHN G. HANKS, OF OAKLAND, CALIFORNIA, ASSIGNOR OF ONE-FOURTH TO ADOLPH HEILBRON, OF SACRAMENTO, AND ADOLPH H. F. SCHAAR, OF SAN FRANCISCO, CALIFORNIA.

DISTANCE-MEASURING INSTRUMENT.

SPECIFICATION forming part of Letters Patent No. 645,918, dated March 20, 1900.

Application filed June 14, 1898. Renewed August 28, 1899. Serial No. 728,764. (No model.)

*To all whom it may concern:*

Be it known that I, JOHN G. HANKS, a citizen of the United States, residing at Oakland, county of Alameda, and State of California, have invented certain new and useful Improvements in Distance-Measuring Instruments; and I hereby declare the following to be a full, clear, and exact description of the same, reference being had to the accompanying drawings, forming a part of this specification.

My invention relates to improvements in parallax measurers to ascertain distances from two stationary points by the intersection of visual lines, also with other functions, such as trigonometrical surveying and determining in one plane the rate of movement of distant objects.

My improvements consist in mounting on a swiveling and adjustable beam two telescopes, one fixed in respect to the beam, with its focal line at a right angle to the axis of the beam, and the other telescope mounted on a swiveling axis and adjusted in a horizontal plane and in respect to the beam by a sector, tangent-screw, and a circular indicating-scale calibrated to read for degrees of revolution which are directly translatable into distance.

My improvements also consist in various constructive and operative features, hereinafter more fully described in the drawings forming a part of this specification.

The objects of my invention are to provide simple apparatus whereby trigonometrical measurements can be made in surveying land, making maps, and the like, also in gunnery to determine the distance of a vessel, fort, or other object to be fired at, and also within certain limits and in connection with a time-measure the rate of a moving object when the course is transverse to or at some determinable angle from the line of sight, the distances being arrived at and read without computation.

Referring to the drawings, Figure I is a side elevation of one of my improved instruments for determining distances. Fig. II is a plan view of the beam or main member, showing its construction. Fig. III is a diagram illustrating the method of operation. Fig. IV is a plan view of the adjustable telescope and the operating devices therefor. Fig. V is an edge or side view of Fig. IV. Fig. VI is a transverse section on the line $xx$ in Fig. IV. Fig. VII is a transverse section on the line $y y$ in Fig. IV. Fig. VIII is a table for aiding in the conversion of readings of the sector-scale into distance-readings.

Similar references are applied to corresponding parts throughout.

Referring to Figs. I and II, 1 and 2 are telescopes of the usual construction, mounted on a beam 3, supported on a post 4, a pillar, or other sufficient structure, and arranged to swivel at 5, where there are screws 35 and 36 for clamping and adjustment in the usual manner.

Fig. III is a diagram illustrating the well-known method of determining distances by parallax or by the angles $m$ and $n$, A being a base representing the line D in Fig. I between the vertical axes of the telescopes 1 and 2, B and C indicating points of sight, and E the direct line of sight at an angle of ninety degrees from the base A. $a$, $b$, and $c$ are objects, and $d$ intersecting lines of sight through the telescope 1.

The method of measuring distances by triangulation being well known does not require further explanation and is not included in my invention, which relates especially to a manner of determining in terms of length the distance from A to objects, as at $a\ b\ c$, by a peculiar method of reading the same and devices accessory thereto. The main member 6 of the beam 3 is preferably a metal tube that fits through and is fastened in a sleeve 7, supported on a suitable standard 4, which latter can be permanent or portable. This beam 6 is made as long as its stability will permit and may, if deemed necessary, be supported at the ends in addition to the standard 4. It is trussed by the rods 8, one at the top and two at the bottom, disposed at three points around the beam, so as to impart rigidity in all planes. The telescope 2 is set at a right angle to the beam 6 and fixed in that position, and the beam is then turned on a swivel at 5 until this telescope is directed on the line E and to objects at $a\ b\ c$. Then the other telescope 1 is adjusted to one of the intersecting lines $d$, as indicated in Fig. III, and the distance from B is then read from a circular scale on the disk 9, which operation will now be described by reference to Figs. IV and V. The split sleeves 10 are adapted to be firmly clamped on the beam 6 by means of a screw 11, and the one on the left is formed integrally with the member 12, to which is attached a base-plate 13. This plate 13 is held and adjusted by means of the screws 14, passing through the lugs 15, the heads 16 resting in concave seats formed in the base-plate 12 and are held down by the flexible clamps 17, so the screws 14 can be turned by the hand-wheels 18. By turning these screws 14 right or left the base-plate 13 can be made level and the spindle 19 of the telescope 1, which is attached to the plate 13, can be set in a true vertical position. The telescope 1 is mounted in the usual manner on trunnions 23, resting in the crotch-bracket 20, which, with the sector 21, is fastened to the spindle 19, that fits into a corresponding socket 22, attached to the plate 13, so the telescope 1 partakes in a horizontal plane of all movements of the sector 21. This sector 21 has a scale of dimensions marked thereon, indicating the number of revolutions either way of the disk 9, with a starting-point at 24, that indicates a position of the telescope 1 parallel to that of the telescope 2 or at a right angle to the base A in Fig. III. A counterweight 37 is applied to balance the weight of the sector 21 across the pivot 19, as shown in Fig. V. On the edge 25 of the sector 21 are formed accurately-spaced teeth, engaged by the screw 26 on the spindle 27, as shown in Fig. IV. This spindle 27 is supported on a spherical bearing 28, held by an adjustable clamp 29, and at the inner end is held by a slotted bearing 30 and a pin 31, pressed inward by a spring 32, so as to hold the screw 26 elastically in mesh with the teeth at 25, and thus prevent lost motion. On the outer end of the spindle 27 is a disk 9, on the face of which is marked a circular scale of division into equal parts, preferably corresponding to degrees, minutes, and seconds of arc, but can be arranged on any desired scale, the object being to determine thereby the fractions of a revolution of the disk 9 and the screw 26, such movement being indicated and read from a fixed index 33, as shown in Fig. V. In this manner the slightest movement of the sector 21 and of the telescope 1 is multiplied and indicated by the circular scale, and distances on the line E are translated into terms of revolution and fractions of revolution of the disk 9, these quantities being originally determined as follows: The instrument is mounted on a stable support, preferably on a wide plain where the land is level. The line E is determined by the telescope 2 for several miles in length or to a distance corresponding to the extreme range for which the implement is intended. This line E is then carefully measured by a surveyor's chain in the usual manner and divided into equidistant stations, as at $a$, $b$, $c$, and $d$, as many as the intended accuracy of the instrument and perfection of the tangent gearing may demand. The telescope 1 is then set parallel to the telescope 2 or normal to the base-line A. The sector 21 then has its zero-point 24 at the index 35 and the circular index on the disk 9 is set with its zero-mark at the index 33. The disk 9 is then turned until the focus of the telescope 1 is on the object $d$. Then the revolution and the fractions thereof are read first from the sector 21 and then from the circular scale on the disk 9 and are entered in the columns F, G, H, and I of a table, as shown in Fig. VIII, and the distance on the line E is entered in columns J and K of the table. These quantities will represent the line $d$, that intersects the line E at the station $d$ on this line and are an expression of the angle $o$ in Fig. III. To measure distances to the other stations, as at $c$, $b$, and $a$, the disk 9 is again turned until the telescope 1 has its focus on the second station $c$, and the added revolutions and fractions thereof are read on the circular scale on the disk 9 and are added to the quantities first entered in the table. The sum will give the distance from B to $c$. This operation is repeated for each station back toward the base-line A until a table is completed for the whole distance or the length of the line E. The quantities in the table can of course be taken by proceeding in the other direction—from the base A outward—the result being the same. By this method it will be seen that errors, if any, in the pitch of the teeth at 25 or of the screw 26 will be practically eliminated and the readings be correct without any chance of error.

I am aware that the quantities in the lines F, G, H, and I of the table can be computed from the ordinates of a geometrical curve generated from the angle of intersection between the line A and the line $d$ or from the angle $m$ and $o$; but experiments prove that such readings, being based upon absolute accuracy in the movements of the instrument, are liable to error and not to be depended upon in practically measuring distances.

In practically operating the instrument the manner of proceeding is the same as described for its calibration, except that when once adjusted the readings are taken as soon as the telescopes are set upon the object, the number of revolutions of the disk 9 from zero-point always being indicated by the scale on the sector 21.

Having thus described the nature and objects of my invention, what I claim as new, and desire to secure by Letters Patent, is—

1. In a distance-measuring instrument, in combination, a supporting-stand, a trussed tubular beam centrally mounted and swiveling thereon, means for adjusting said beam to a fixed position and clamping it when adjusted, a telescope mounted in horizontal bearings at one end of said beam having its line of sight at right angles to the axis of the beam, a telescope at the other end of said beam mounted in horizontal bearings on a vertical swiveling spindle, means for bringing said spindle into true verticality, a counterweighted graduated sector-plate, accurately toothed upon its circumference, secured to said vertical spindle, a horizontal spindle with worm-gear intermeshing with said toothed sector-plate, means for holding said worm-gear elastically in mesh to prevent lost motion, and a circularly-graduated disk on the end of said horizontal spindle, for obtaining micrometer readings of the angular position of the sector-plate, substantially as specified.

2. In a distance-measuring instrument, in combination, a supporting-stand, a trussed tubular beam centrally mounted and swiveling thereon, means for adjusting said beam to a fixed position and clamping it when adjusted, a telescope in horizontal bearings adjustably and removably mounted on one end of said beam by clamping means, a telescope at the other end of said beam mounted in horizontal bearings on a vertical swiveling spindle, means for bringing said spindle into true verticality, a counterweighted graduated toothed sector-plate secured to said vertical spindle, a horizontal spindle with worm-gear intermeshing with said toothed sector-plate, and a circularly-graduated disk on the end of said horizontal spindle; said telescope, vertical spindle, means for obtaining verticality, counterweighted sector-plate, worm-gear spindle, and graduated disk, all mounted on an adjustable and removable clamping means, whereby they are secured to said beam, substantially as specified.

JOHN G. HANKS.

Witnesses:
 ELIZA P. BROWN,
 MAY E. BROWN.